J. M. CARSON.
DIES FOR FORMING TRAP SECTIONS.

No. 176,835. Patented May 2, 1876.

Witnesses:
James Martin Jr.
R. L. Fenwick.

Inventor.
John M. Carson
by
Mason, Fenwick & Lawrence

UNITED STATES PATENT OFFICE.

JOHN M. CARSON, OF LOUISVILLE, KENTUCKY.

IMPROVEMENT IN DIES FOR FORMING TRAP-SECTIONS.

Specification forming part of Letters Patent No. 176,835, dated May 2, 1876; application filed April 8, 1876.

*To all whom it may concern:*

Be it known that I, JOHN M. CARSON, of Louisville, in the county of Jefferson and State of Kentucky, have invented a new and useful Improvement in Dies for Forming Sections of Air or Gas Traps, which improvement is fully set forth in the following specification, reference being had to the accompanying drawings, in which—

Figure 1:
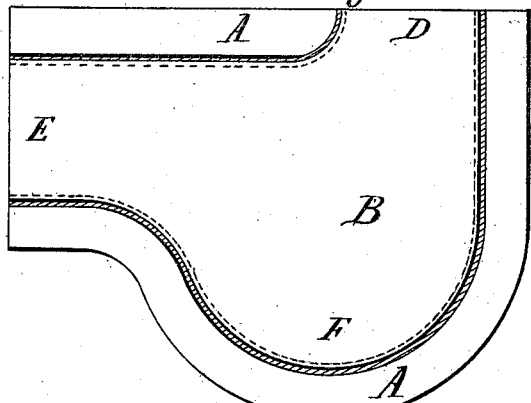
Figure 2:
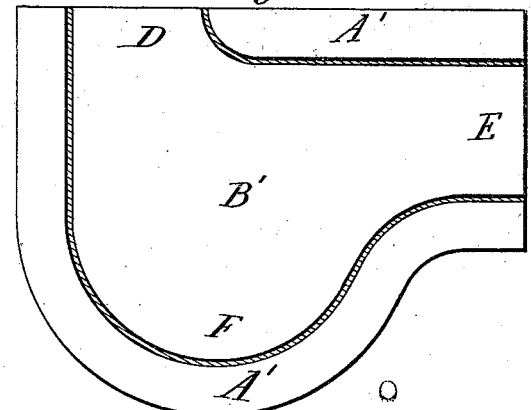
Figure 3:
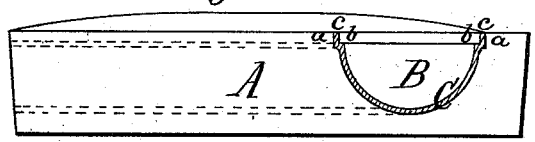
Figure 4:
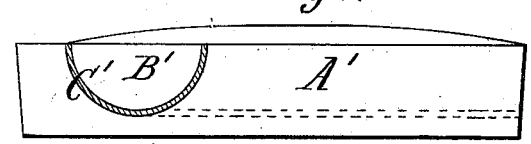
Figure 5:
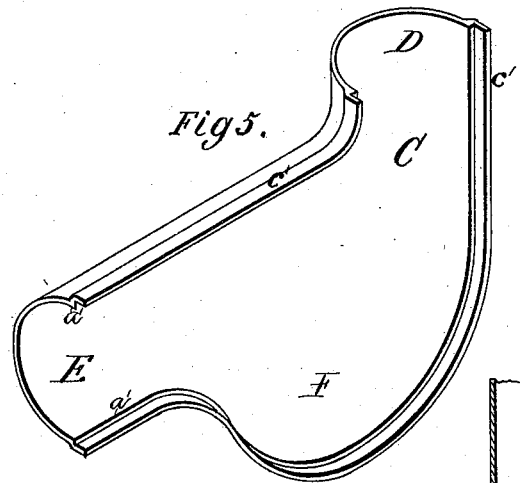
Figure 6:
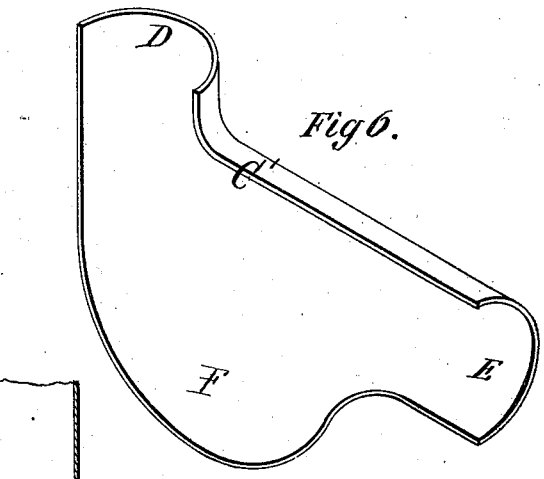
Figure 7:
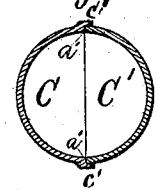
Figure 8:
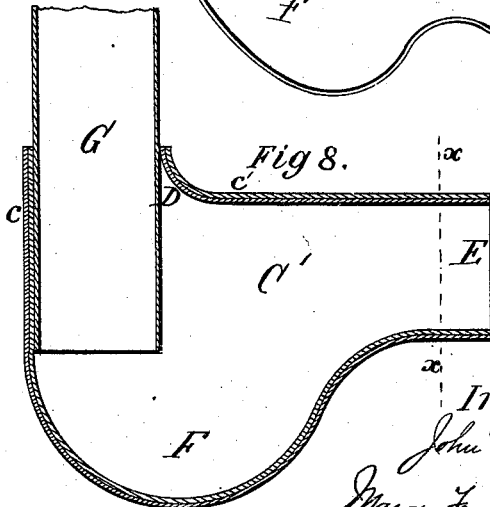

Figure 1 is a top view of the dies for the lapped or female sections, showing a vertical section of the trap formed by the dies. Fig. 2 is a top view of the dies for the male section, showing a vertical section of the trap formed by the dies. Fig. 3 is an elevation of the dies for the lapped or female section of the trap, showing also a cross-section of the trap. Fig. 4 is an elevation of the dies for the male section of the trap, showing also a cross-section of the trap. Fig. 5 represents the lapped or female section in perspective of the trap as it appears when finished. Fig. 6 represents the male section of the trap in perspective when finished. Fig. 7 is a cross-section of the united sections of the trap, in the line $x\ x$ of Fig. 8. Fig. 8 is a vertical central longitudinal section of the trap when finished.

The nature of my invention consists of two or more sets of matched dies, in which two or more sections of a foul-air trap are formed, one or more of which sections, when formed, having shoulders and lapping edges for covering and strengthening the trap at the joints.

My invention consists, further, in the construction of a foul-air trap of sections, one or more of which sections are provided with shoulders and lapping edges for covering and strengthening the joints.

The object of my invention is to produce, by dies and from sheet lead or other ductile sheet metal, a very durable and cheap gas-trap, the manufacture of which requires less time, skill, and soldering material than the gas-traps of common manufacture, and which trap is superior in its character to other traps heretofore made.

To enable others skilled in the art to understand my invention, I will proceed to describe it.

In the accompanying drawings, A represents the lower die for shaping the female half C of a gas-trap, with continuous shoulders or steps $a'$ and laps or flanges $c'$ along the adjoining edges of the sections of the trap. The said laps are formed by shoulders or steps $a$ in the lower die A, and by corresponding outer shoulders or steps $b$ on the upper die B. The male half $C'$ of the gas-trap is formed in a die of simpler construction, consisting of the lower die $A'$ and the upper die $B'$, without any steps, as the said half has no lap or flange of the above description. The shape of the trap is of the simplest form possible, there being an oval tank, F, a vertical passage, D, and a horizontal passage, E, so united that, to make the trap effective, the sewer or waste-pipe G has to be inserted into the passage D, and below the lower level of the horizontal passage E.

After the blanks for the described halves are cut from the sheet metal, (lead being preferred,) they are laid on the lower dies A and $A'$, according to their intended use, and the upper dies B B' are put on top of them. Partly by pressure of the hand and partly by blows of a mallet or hammer on the rounded or convex backs of the upper dies they are forced down to their normal positions, when the shaping of the halves C C' will be finished. The said halves C C' are now placed together and the flanges $c'$ are soldered onto the halves C. The pipe G is then inserted in the manner described, and the trap is finished and ready for use.

It is a well-known fact that traps of the above description cannot be made by hand the same as traps of a more common construction without so much loss of time as to make them a very expensive article of manufacture. It is further known that even the primitive mode of construction now resorted to involves great skill, and an unusual amount of soldering material for strengthening and covering up the unavoidable imperfect joints of such traps, whereas with my dies any unskilled person may shape the halves belonging to the trap, and even if the blanks should be imperfectly cut, they may be trimmed down in the dies to the correct shape. The work of soldering the halves together is so simple that a boy may in the shortest time learn to do it with great rapidity. In case of very large traps it might be desirable to make each pair of dies to form one quarter section of the trap instead of one half; and in such case, two lap-joints would be formed on each section, just the same as when the trap is made of two sections. Thus is it seen that with very simple means, and in very little time, a very strong and cheap gas trap is produced by my invention.

Having described my invention, what I claim, and desire to secure by Letters Patent, is—

1. The combination of the dies A B, having the steps or shoulders *a b* and the dies A' B', substantially as and for the purpose set forth.

2. The section C, jointly with the section C' of the trap, formed to be united by lap-joints, substantially as and for the purpose herein described.

JOHN MAXWELL CARSON.

Witnesses:
 HENRY YOUNG,
 O. L. MILLER.